United States Patent
Choi et al.

(10) Patent No.: US 9,791,600 B2
(45) Date of Patent: Oct. 17, 2017

(54) MICRO-LENS CAPABLE OF CHANGING FOCAL LENGTH, MICRO-LENS ARRAY INCLUDING THE SAME, 3D DISPLAY INCLUDING MICRO-LENS ARRAY AND METHOD OF OPERATING 3D DISPLAY

(71) Applicant: Samsung Electronics Co., Ltd., Suwon-si (KR)

(72) Inventors: Kyu-hwan Choi, Yongin-si (KR); Yun-hee Kim, Seoul (KR); Eok-su Kim, Seongnam-si (KR); Jung-mok Bae, Seoul (KR); Hoon Song, Yongin-si (KR); Kang-hee Won, Seoul (KR); Yoon-sun Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 864 days.

(21) Appl. No.: 13/690,181

(22) Filed: Nov. 30, 2012

(65) Prior Publication Data
US 2013/0194323 A1    Aug. 1, 2013

(30) Foreign Application Priority Data
Jan. 30, 2012 (KR) .................. 10-2012-0009209

(51) Int. Cl.
| | |
|---|---|
| *G02B 26/00* | (2006.01) |
| *G02F 1/03* | (2006.01) |
| *G02B 1/06* | (2006.01) |
| *G02F 1/133* | (2006.01) |
| *G02B 3/14* | (2006.01) |
| *G02B 3/00* | (2006.01) |
| *G09G 5/00* | (2006.01) |

(52) U.S. Cl.
CPC .............. *G02B 3/14* (2013.01); *G02B 3/0006* (2013.01); *G02B 26/005* (2013.01); *G09G 5/00* (2013.01)

(58) Field of Classification Search
CPC ... G02F 1/133; G02F 1/29; G02F 1/01; G02F 1/03; G02F 1/15; G02F 1/155; G02F 1/153; G02B 5/23; G02B 26/00; G02B 26/08; G02B 1/06
USPC ........ 359/290–293, 295, 315–316, 276, 238, 359/245, 242, 259, 244, 253–254, 359/265–275, 665–667, 223–225, 243, 359/260–263; 349/33; 252/586
See application file for complete search history.

(56) References Cited

U.S. PATENT DOCUMENTS

| | | | |
|---|---|---|---|
| 7,515,340 B1 | 4/2009 | Shiu et al. | |
| 7,701,637 B2 | 4/2010 | Redert | |
| 2002/0118464 A1* | 8/2002 | Nishioka et al. ............. | 359/642 |
| 2004/0086709 A1* | 5/2004 | Hammond Cunningham et al. .............................. | 428/335 |
| 2007/0127102 A1* | 6/2007 | Obinata ........................ | 359/196 |
| 2007/0177276 A1* | 8/2007 | Liogier D'ardhuy et al. ............................. | 359/666 |

(Continued)

FOREIGN PATENT DOCUMENTS

| | | |
|---|---|---|
| KR | 10-2007-0097810 | 10/2007 |
| KR | 10-2009-0026759 | 3/2009 |

(Continued)

*Primary Examiner* — Dawayne A Pinkney
(74) *Attorney, Agent, or Firm* — NSIP Law

(57) ABSTRACT

Provided is a micro-lens capable of changing a focal length. The micro-lens includes a plurality of electrodes, and an electrowetting liquid layer that is separable from the electrodes and that has a focal length that is controlled by a voltage applied to the electrodes.

30 Claims, 6 Drawing Sheets

(56) References Cited

U.S. PATENT DOCUMENTS

| | | | |
|---|---|---|---|
| 2008/0019015 A1* | 1/2008 | Fernandez et al. | 359/666 |
| 2008/0151168 A1* | 6/2008 | Sekiguchi | G02B 3/14 |
| | | | 349/142 |
| 2008/0198292 A1 | 8/2008 | Marra et al. | |
| 2008/0316302 A1 | 12/2008 | Vos et al. | |
| 2010/0110532 A1* | 5/2010 | Takemoto | G02B 3/14 |
| | | | 359/316 |
| 2010/0157026 A1 | 6/2010 | Reichelt | |
| 2012/0242921 A1* | 9/2012 | Shen et al. | 349/43 |

FOREIGN PATENT DOCUMENTS

| | | |
|---|---|---|
| KR | 10-2011-0045237 | 5/2011 |
| KR | 10-1080476 | 11/2011 |
| WO | WO 2009/050273 A3 | 4/2009 |

\* cited by examiner

MICRO-LENS CAPABLE OF CHANGING FOCAL LENGTH, MICRO-LENS ARRAY INCLUDING THE SAME, 3D DISPLAY INCLUDING MICRO-LENS ARRAY AND METHOD OF OPERATING 3D DISPLAY

CROSS-REFERENCE TO RELATED APPLICATION(S)

This application claims the benefit under 35 USC §119(a) of Korean Patent Application No. 10-2012-0009209, filed on Jan. 30, 2012, in the Korean Intellectual Property Office, the entire disclosure of which is incorporated herein by reference for all purposes.

BACKGROUND

1. Field

The present disclosure relates to displays, and more particularly, to micro-lenses capable of changing focal length, micro-lens arrays including the same, 3D displays including the micro-lens arrays and methods of operating the 3D displays.

2. Description of Related Art

A 3D image may be displayed in various ways. An example display method is a glass-type method that uses a shutter or polarized light. The glass-type method, however, is limited in the number of viewpoints that it creates. In addition, a 3D image is displayed mainly with stereoscopic techniques, and thus, a viewer's eyes get tired easily.

Another example display method is a holographic display method. This method may generate a natural 3D image using a wavefront generation method. However, the holographic display method uses a laser source that has a high coherence. The lasers that are used as light sources are very limited. Also, there is a noise problem, such as speckle noise on a display surface on which an image is displayed and also a problem in that an image size and a viewing angle may be limited.

Another example display method is an integrated image method that uses a lens array. The integrated image method has advantages in that realization of color is easy, consecutive viewing angles may be secured, and an optical system may be simplified. In addition, the integrated image method may be used in high performance cameras and charge-coupled devices.

However, because the integrated image method uses a micro-lens array, an integrated image may be limited. Also, there is a limit in the depth and viewing angle of a 3D image that is generated through the micro-lens array.

SUMMARY

In an aspect, there is provided a micro-lens, including a plurality of electrodes, and an electrowetting liquid layer that is separable from the electrodes and that comprises a focal length that is controlled by a voltage applied to the electrodes, wherein the electrodes are disposed around the electrowetting liquid layer.

The micro-lens may further comprise an insulating layer and a hydrophobic film sequentially formed between the electrodes and the electrowetting liquid layer.

The micro-lens may further comprise an upper electrode and a glass substrate that are sequentially formed on the electrowetting liquid layer and the electrodes, wherein a portion of the electrowetting liquid layer extends between the upper electrode and the hydrophobic film.

The electrowetting liquid layer may comprise a non-polar first material, a polar second material, and an electrolyte that is included in at least one of the non-polar first material and the polar second material.

The insulating layer may comprise a $SiO_2$ layer or a SiN layer.

The insulating layer may comprise a Cytop layer, an $HfO_2$ layer, and a Mo layer sequentially stacked in the stated order.

The hydrophobic film may comprise a Parylene C film, a Cytop film, or a Taflon film.

The polarized second material may comprise deionized (DI) water.

The non-polarized material may comprise oil.

The electrolyte may comprise NaCl and SDS.

The electrolyte may comprise a polymer electrolyte.

The oil may comprise a first mixture that comprises bromonaphthalene, chloronaphthalene, and dodecane or a second mixture that comprises chloronaphthalene and bromododecane.

If the oil is the first mixture, a mixing ratio of chloronaphthalene and dodecane is may be in a range from 50:50 to 99:1.

If the oil is the second mixture, a mixing ratio of chloronaphthalene and bromododecane may be in a range from 50:50 to 99:1.

The polymer electrolyte may comprise 0.01% to 1% polyacrylic acid.

In an aspect, there is provided a micro-lens array that comprises a plurality of micro-lenses, each micro-lens including a plurality of electrodes, and an electrowetting liquid layer that is separable from the electrodes and that comprises a focal length that is controlled by a voltage applied to the electrodes, wherein the electrodes are disposed around the electrowetting liquid layer.

The micro-lenses may be arranged as a planar surface or a curved surface.

In an aspect, there is provided a three-dimensional (3D) display including a first micro-lens unit comprising an array of micro-lenses configured to focus an image of an object on a location, at least one micro-lens comprising a plurality of electrodes and an electrowetting liquid layer that is separable from the electrodes and that comprises a focal length that is controlled by a voltage applied to the electrodes, an image pick-up unit configured to pick up the image through the first micro-lens unit, an interlocking control device configured to process the image transmitted from the image pick-up unit, a display unit configured to project the image transmitted from the interlocking control device to a predetermined region, and a second micro-lens unit configured to focus the image transmitted from the display unit to a predetermined region.

The at least one micro-lens may further comprise an insulating layer and a hydrophobic film sequentially formed between the electrodes and the electrowetting liquid layer.

The electrowetting liquid layer may comprise a non-polar first material, a polar second material, and an electrolyte included in at least one of the non-polar first material and the polar second material.

The insulating layer may comprise a $SiO_2$ layer or a SiN layer and the hydrophobic film may comprise a Parylene C film, a Cytop film, or a Taflon film.

The insulating layer may comprise a Cytop layer, an $HfO_2$ layer, and a Mo layer that are sequentially stacked in the stated order.

The second material may comprise deionized (DI) water.

The first material may comprise a first mixture that comprises bromonaphthalene, chloronaphthalene, and dodecane or a second mixture that comprises chloronaphthalene and bromododecane.

The electrolyte may comprise NaCl and SDS or a polymer electrolyte.

The first material may comprise the first mixture, and the mixing ratio of chloronaphthalene and dodecane may be in a range from 50:50 to 99:1.

The first material may comprise the second mixture, and the mixing ratio of chloronaphthalene and bromododecane is in a range from 50:50 to 99:1.

The polymer electrolyte may comprise from 0.01% to 1% polyacrylic acid.

Other features and aspects will be apparent from the following detailed description, the drawings, and the claims.

Figure 1:
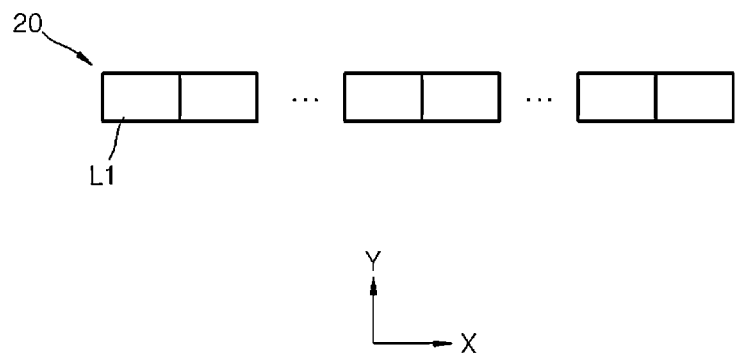
FIG. 1 is a diagram illustrating an example of a micro-lens array.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Various examples herein relate to a micro-lens array 20 which may include a micro-lens L1.

Figure 9:
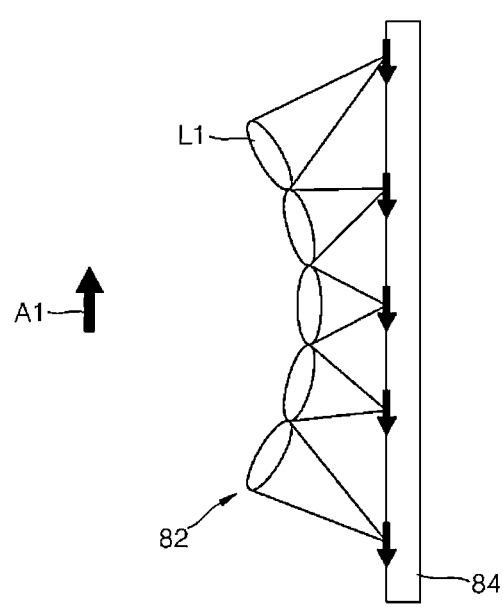
FIG. 9 is a diagram illustrating an example of a circular-arc arrangement of micro-lenses of the first micro-lens unit of FIG. 8.

FIG. 1 illustrates an example of the micro-lens array 20. Referring to FIG. 1, the micro-lens array 20 includes a plurality of micro-lenses L1. In this example, the micro-lenses L1 are arranged in a row along an X-axis direction. The arrangement direction of the micro-lenses L1 is arbitrary. The micro-lenses L1 may form a plane by arranging the micro-lenses L1 in a straight line or as another example may form a curved surface by arranging the micro-lenses L1 in a curved line. FIG. 9 illustrates an example of micro-lenses L1 that are arranged in a circular arc. The micro-lenses L1 may be focal length-changing micro-lenses. A focal length of the micro-lenses L1 may be changed by applying a voltage.

Figure 2:
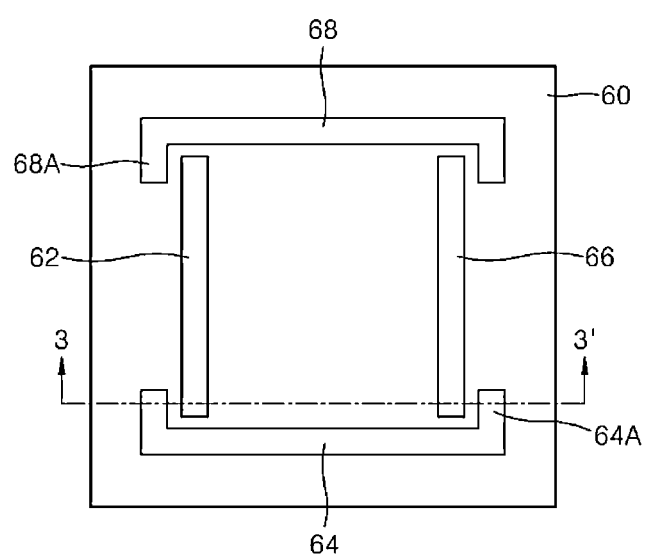
FIG. 2 is a diagram illustrating an example of an electrowetting micro-lens of the micro-lens array of FIG. 1.

FIG. 2 illustrates an electrowetting optic-device as an example of a micro-lens L1. Referring to FIG. 2, the micro-lens L1 includes first through fourth electrodes 62, 64, 66, and 68. The first and third electrodes 62 and 66 are separated and are disposed parallel to each other. The second and fourth electrodes 64 and 68 are disposed perpendicular to the first and third electrodes 62 and 66. The second and fourth electrodes 64 and 68 are separated and are also disposed parallel to each other. The first and third electrodes 62 and 66 are disposed between the second and fourth electrodes 64 and 68. The second electrode 64 includes first bending units 64A on both edges. The fourth electrode 68 includes second bending units 68A. The first and second bending units 64A and 68A are bent inward and face each other.

The first bending units 64A of the second electrode 64 overlap with edges of the first and third electrodes 62 and 66. The second bending units 68A of the fourth electrode 68 overlap with the other edges of the first and third electrodes 62 and 66. An inner-space surrounded by the first through fourth electrodes 62, 64, 66, and 68 may be filled with a liquid-phase material layer that constitutes a refractive interface. However, for convenience of explanation, the liquid-phase material layer is not depicted. In FIG. 2, a glass substrate 60 that covers the first through fourth electrodes 62, 64, 66, and 68 is formed.

Figure 3:
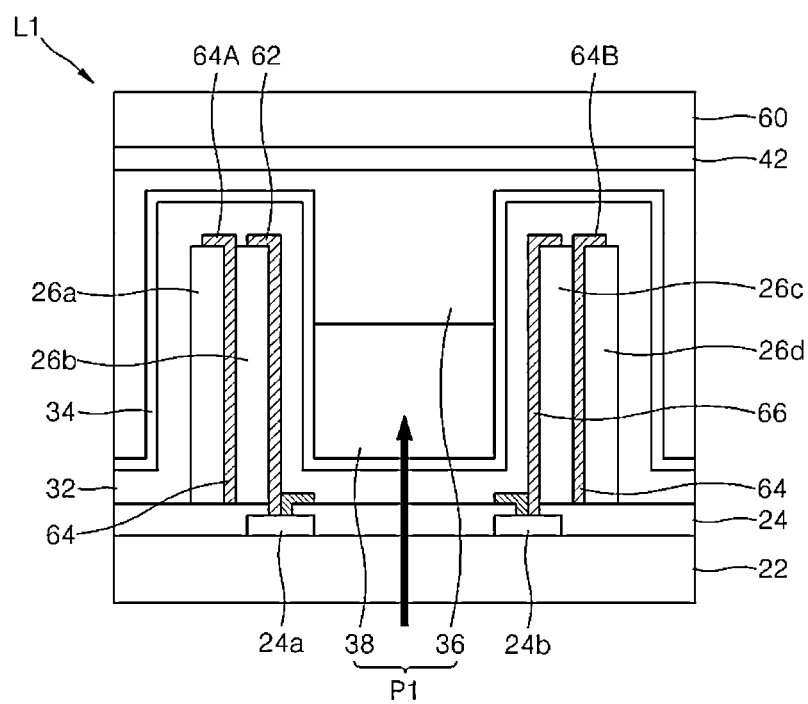
FIG. 3 is a cross-sectional view illustrating an example taken along line 3-3' of FIG. 2.

FIG. 3 illustrates an example of a view taken along line 3-3' of FIG. 2. Referring to FIG. 3, first and second wirings 24a and 24b are on a transparent substrate 22. The first and second wirings 24a and 24b are lower electrodes. An interlayer insulating layer 24 that covers the first and second wirings 24a and 24b is formed on the transparent substrate 22. For example, the interlayer insulating layer 24 may be a transparent insulating film such as a silicon oxide film. In this example, first through fourth organic barrier ribs 26a through 26d are formed on the interlayer insulating layer 24. The first and second organic barrier ribs 26a and 26b are separated from the third and fourth organic barrier ribs 26c and 26d.

A liquid-phase electrowetting material layer P1 (hereinafter, a liquid layer P1) may be formed between the first and second organic barrier ribs 26a and 26b and the third and fourth organic barrier ribs 26c and 26d. A surface of the liquid layer P1 may vary according to a voltage that is applied to one or more of the first through fourth electrodes 62, 64, 66, and 68. Accordingly, the surface of the liquid layer P1 may be formed to be a convex-type curved surface by controlling the voltage applied to the first through fourth electrodes 62, 64, 66, and 68. An alternate current voltage or a direct current voltage may be applied to the first through fourth electrodes 62, 64, 66, and 68. For example, an alternate current voltage in a frequency range from about 15 Hz to about 5,000 Hz may be applied. For example, the waveform of the alternate current voltage may be a sine waveform, a square waveform, a saw-tooth waveform, and the like.

When the surface of the liquid layer P1 is transformed to a curved surface, the curvature of the curved surface varies according to the applied voltage. Because the curvature of the curved surface of the liquid layer P1 varies according to the voltage applied to the first through fourth electrodes 62, 64, 66, and 68, the liquid layer P1 may be used as a lens and a focal length of the lens may be controlled. Therefore, when light represented by the arrow is incident to the liquid layer P1, and the light is parallel light, the light converges onto a focus of the liquid layer P1. Accordingly, the focal length of the liquid layer P1 may vary according to the voltage application conditions. As a result, the location of the light convergence may vary. Because the curvature of the surface of the liquid layer P1 may be controlled by controlling the voltage application conditions, an F-number f/# and the number of aperture of the liquid layer P1 may be controlled.

The liquid layer P1 may include a first material 38, a second material 36, and an electrolyte (not shown). The first material 38 may be a non-polarizing material. The second material 36 may be a polarizing material. The first material 38 and the second material 36 may have different refractive indexes. The electrolyte may be distributed in one of the first material 38 and the second material 36, or may be distributed in both of the first material 38 and the second material 36. Light may sequentially pass through the first material 38 and the second material 36. As an example, the first material 38 may be oil such as bromonaphthalene. As another example, the first material 38 may be a first mixture that includes chloronaphthalene and dodecane. In this example, the mixing ratio of chloronaphthalene and dodecane in the first mixture may be in a range from about 50:50 to about 99:1. The first material 38 may also be a second mixture that includes chloronaphthalene and bromododecane. In this example, the mixing ratio of the chloronaphthalene and bromododecane in the second mixture may be in a range from about 50:50 to about 99:1. The first and second mixtures may include the electrolyte. The electrolyte may be polyelectrolyte. For example, the electrolyte may include polyacrylic acid approximately in a range from about 0.01% to about 1%.

The second material 36 may be, for example, deionized water (DI) water. As another example, the second material 36 may be a solution including an electrolyte. For example, the second material 36 may be an electrolyte solution that includes DI water, 0.005 M NaCl, and 0.1% SDS.

Referring to FIGS. 2 and 3, a first bending unit 64A of the second electrode 64 is disposed between the first and second organic barrier ribs 26a and 26b. The first bending unit 64A partially extends on an upper surface of the first organic barrier rib 26a and faces the outside of the micro-lens L1. Also, the first electrode 62 is on an inner wall of the second organic barrier rib 26b. The first electrode 62 extends on an upper surface of the second organic barrier rib 26b and faces the outside of the micro-lens L1, but does not contact the first bending unit 64A of the second electrode 64.

The first electrode 62 is connected to the first wiring 24a. For example, a voltage may be applied to the first electrode 62 through the first wiring 24a. A second bending unit 64B of the second electrode 64 is disposed between the third and fourth organic barrier ribs 26c and 26d. The second bending unit 64B partially extends on an upper surface of the fourth organic barrier rib 26d and faces the outside of the micro-lens L1.

The third electrode 66 is on an inner wall of the third organic barrier rib 26c. The third electrode 66 partially extends on an upper surface of the third organic barrier rib 26c, faces the outside of the micro-lens L1, and is separated from the first bending unit 64B of the second electrode 64. The third electrode 66 is connected to the second wiring 24b. Accordingly, a voltage for changing a curvature of a surface of the liquid layer P1 may be applied to the third electrode 66 through the second wiring 24b.

Although not shown in FIG. 2, the second and fourth electrodes 64 and 68 may also be connected to wirings for applying a voltage for changing a curvature of a surface of the liquid layer P1. An insulating layer 32 and a coating layer 34 are sequentially stacked between the first through fourth organic barrier ribs 26a through 26b, the first bending units 64A, the second bending units 64B, the first electrode 62, the third electrode 66, and the liquid layer P1. The coating layer 34 may include a material layer that has hydrophobic properties. The insulating layer 32 and the coating layer 34 may cover the first through fourth organic barrier ribs 26a through 26d, the first and second units 64A and 64b, the first electrode 62, and the third electrode 66. The insulating layer 32 and the coating layer 34 may be separation layers that separate the first through fourth organic barrier ribs 26a through 26d, the first bending unit 64A, the second bending unit 64B, the first electrode 62, and the third electrode 66 from the liquid layer P1.

In this example, an upper electrode 42 and a glass substrate 60 are sequentially formed on the coating layer 34. A space between the coating layer 34 and the upper electrode 42 is filled with the second material 36. The second material 36 is filled between the micro-lenses L1. For example, the insulating layer 32 may be formed by sequentially stacking a Cytop layer, an $HfO_2$ layer, and a Mo layer. In this example, the Cytop layer may have a thickness in a range from about 50 Å to about 500 Å, for example, may be 300 Å. Also, the $HfO_2$ layer may have a thickness in a range from about 1,500 Å to about 2,500 Å, for example, may be 2000 Å. The Mo layer may have a thickness similar to that of the $HfO_2$ layer. As another example, the insulating layer 32 may be an inorganic insulating layer, for example, a SiN layer or a $SiO_2$ layer. Materials used to form the first material 38 and the second material 36 may vary according to the insulating layer 32. The coating layer 34 may be a hydrophobic polymer layer that has a predetermined thickness, for example, a Cytop layer, a parylene C layer, or a Teflon layer.

Figure 4:
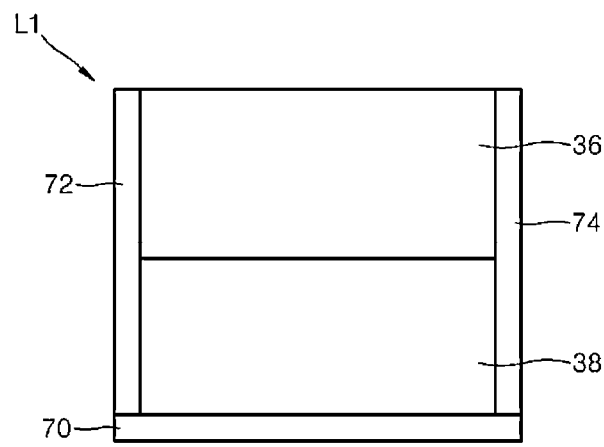
FIG. 4 is a diagram illustrating an example of micro-lenses L1 of FIG. 2.

FIG. 4 illustrates an example of a micro-lens L1 of FIG. 2. In subsequent descriptions, micro-lenses may be the micro-lens L1 of FIG. 4.

In FIG. 4, a lower insulating layer 70 corresponds to the interlayer insulating layer 24 of FIG. 2, a left-side electrode 72 corresponds to the first electrode 62 and the first bending unit 64A on the left-side of the second electrode 64 of FIG. 2, and a right-side electrode 74 corresponds to the third electrode 66 and the second bending unit 64B on the right-side of the second electrode 64 of FIG. 2.

Figure 5:
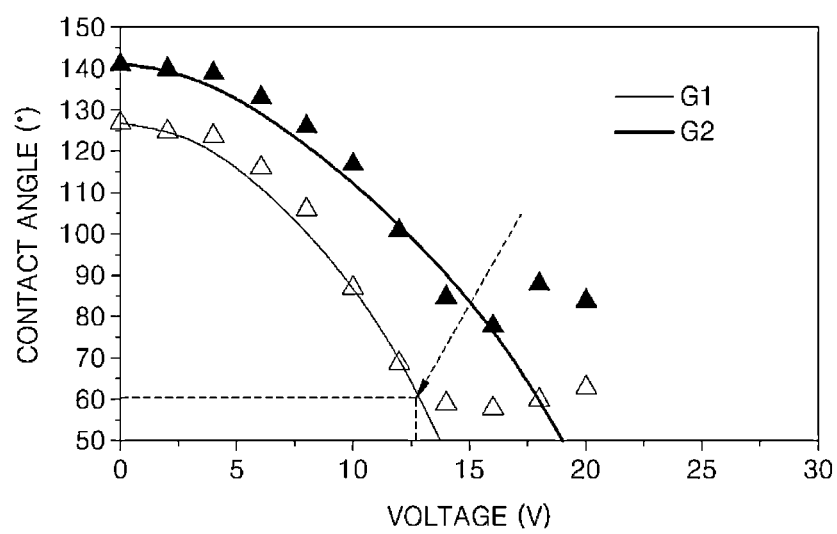
FIG. 5 is a graph illustrating an example of the variation of contact angles of an electrowetting liquid layer P1 according to voltages applied to a micro-lens.

FIG. 5 is a graph that illustrates an example of the variation of contact angles of an electrowetting liquid layer P1 (a liquid layer P1) according to voltages applied to the micro-lens L1.

In FIG. 5, a horizontal axis indicates a voltage applied to the micro-lens L1, and a vertical axis indicates contact angles of the liquid layer P1 according to the applied voltages. A first graph G1 shows the contact angles when an electrolyte of 0.005 M NaCl and 0.1% SDS is included in a liquid layer P1 that includes water and oil. A second graph G2 shows the result of contact angles when an electrolyte of 0.005 M NaCl and 0.05% SDS is included in a liquid layer P1.

Referring to the first and second graphs 01 and G2, the variation trends of the contact angles are similar to each other. Also, in a given voltage range, the contact angle is reduced as the applied voltage increases. The reduction in contact angle denotes that a curvature of a surface of the liquid layer P1 increases. That is, the surface convex of the liquid layer P1 increases.

Figure 6:
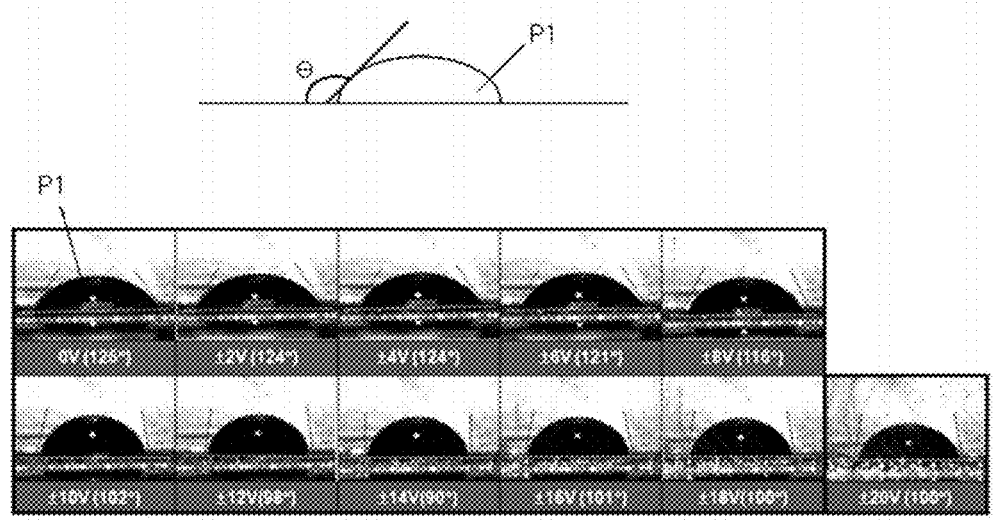
FIG. 6 is a diagram illustrating an example of the results of the variation (a surface curvature variation of a liquid layer) of contact angles θ of the liquid layer P1 of the micro-lens L1 according to the applied voltage.

FIG. 6 illustrates examples of contact angles θ of the liquid layer P1 of the micro-lenses L1 generated according to the applied voltage. The test results show curvature variations of the surface of the liquid layer P1. In FIG. 6, an upper drawing illustrates contact angles. A contact angle is an angle between a horizontal line and a tangent line with respect to the liquid layer P1.

Referring to FIG. 6, the contact angle θ of the liquid layer P1 is gradually reduced as the voltage increases from 0 V to 14 V. When the voltage is further increased, the contact angle θ is increased. In other words, the curvature of the surface of the liquid layer P1 increases as the voltage increases to 14 V, and at voltages higher than 14 V, the curvature is reduced.

The results of FIG. 6 show that a focal length of the liquid layer P1 may be controlled according to voltage application conditions. For example, the focal length of the micro-lenses L1 that include the liquid layer P1 may be controlled by controlling the applied voltage. In the micro-lens array 20 of FIG. 1, the focal length of each of the micro-lenses L1 may be controlled to be different according to voltage application conditions. Accordingly, the micro-lens array 20 may be applied to various fields and products that require or otherwise make use of a variation in focal lengths of the micro-lenses L1. For example, the micro-lens array 20 of FIG. 1 may be applied to 3D displays.

Figure 7:
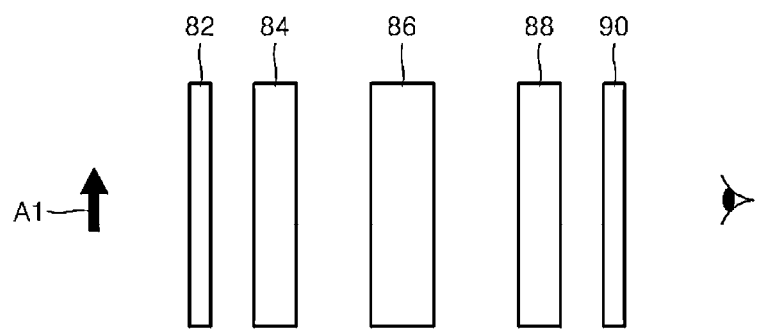
FIG. 7 is a diagram illustrating an example of a 3D display including the micro-lens array of FIG. 1.

FIG. 7 illustrates an example of a 3D display including the micro-lens array 20 of FIG. 1

Referring to FIG. 7, the 3D display includes a first micro-lens unit 82, an image pick-up unit 84, an interlocking control device 86, a display unit 88, and a second micro-lens unit 90. These elements are depicted in the order of stated. An integrated image A1 that is in front of the first micro-lens unit 82 is focused (recorded) on the image pick-up unit 84 by the first micro-lens unit 82. The first micro-lens unit 82 may include a plurality of micro-lenses L1, and may be the micro-lens array 20 of FIG. 1.

A surface of the liquid layer P1 of the micro-lens array 20 faces the image pick-up unit 84. The image pick-up unit 84 may be, for example, a camera or a charge-coupled device (CCD). The integrated image A1 on the image pick-up unit 84 is transmitted to the display unit 88 through the interlocking control device 86. The interlocking control device 86 may control a focal length of the micro-lenses L1 included in the first micro-lens unit 82. The interlocking control device 86 may process an image transmitted from the image pick-up unit 84 to transmit the image to the display unit 88. For example, the interlocking control device 86 may be a computer. The display unit 88 projects an image transmitted from the interlocking control device 86 to the second micro-lens unit 90. The projected image may be a 3D image. The display unit 88 may be, for example, a projector. The second micro-lens unit 90 may be a micro-lens array, for example, the micro-lens array 20 of FIG. 1. In this example, the surface of the liquid layer P1 of the micro-lens array 20 may face a viewer.

Figure 8:
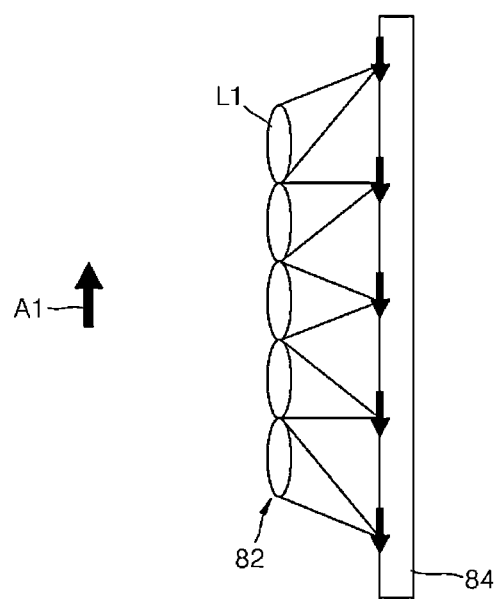
FIG. 8 is a diagram illustrating an example of focusing an integrated image on an image pick-up unit through a first micro-lens unit of FIG. 7.

FIG. 8 illustrates an example of an integrated image A1 focused on the image pick-up unit 84 through the first micro-lens unit 82 of FIG. 7. In FIG. 8, for convenience, the micro-lenses L1 of FIG. 1 are depicted as convex lenses.

It should be appreciated that there may be curvature difference of each of the micro-lenses L1 according to an applied voltage. However, for convenience, it is described instead of being shown in the drawing.

Referring to FIG. 8, a focal length of each of the micro-lenses L1 of the first micro-lens unit 82 may be controlled at each position so that an integrated image A1 is focused on a sensing region of the image pick-up unit 84. To control the focal length, a voltage may be applied to each of the micro-lenses L1 of the first micro-lens unit 82.

FIG. 9 illustrates an example of a circular-arc arrangement of the micro-lenses L1 of the first micro-lens unit 82 of FIG. 7. In the example of FIG. 8, the first micro-lens unit 82 is a plane. However, the arrangement of the micro-lenses L1 of the first micro-lens unit 82 may be changed to a curved one, as shown in FIG. 9. Furthermore, in FIG. 9, the focal length of each of the micro-lenses L1 may be controlled by applying a voltage so that a focus of each of the micro-lenses L1 of the first micro-lens unit 82 is focused on a region of the image pick-up unit 84. Accordingly, each of the micro-lenses L1 may focus an integrated image A1 on a region of the image pick-up unit 84. The focal length of each of the micro-lenses L1 may be controlled differently according to a voltage application condition. Therefore, a gap mismatch due to a space distance difference between each of the micro-lenses L1 and the image pick-up unit 84 may be resolved, and a basic image region may also be increased. In addition, a viewing angle may be increased without image distortion.

What is claimed is:

1. A micro-lens, comprising:
   a plurality of electrodes disposed to form a perimeter surrounding a space,
   wherein a first electrode of the plurality of electrodes comprise in a plan view first and second bends on both ends of the first electrode, wherein the first and second bends are bent inward and face each other, and wherein the first and second bends overlap edges of an additional electrode among the plurality of electrodes; and
   an electrowetting liquid layer disposed in the space and separated from the electrodes, and that comprises a focal length controlled by a voltage applied to the electrodes.

2. The micro-lens of claim 1, further comprising an insulating layer and a hydrophobic film sequentially formed between the electrodes and the electrowetting liquid layer.

3. The micro-lens of claim 2, further comprising:
   an upper electrode and a glass substrate that are sequentially formed on the electrowetting liquid layer and the electrodes,
   wherein a portion of the electrowetting liquid layer extends between the upper electrode and the hydrophobic film.

4. The micro-lens of claim 1, wherein the electrowetting liquid layer comprises:
   a non-polar first material;
   a polar second material; and
   an electrolyte that is included in at least one of the non-polar first material and the polar second material.

5. The micro-lens of claim 2, wherein the insulating layer comprises a $SiO_2$ layer or a SiN layer.

6. The micro-lens of claim 2, wherein the insulating layer comprises a Cytop layer, an $HfO_2$ layer, and a Mo layer sequentially stacked in the stated order.

7. The micro-lens of claim 5, wherein the hydrophobic film comprises a Parylene C film, a Cytop film, or a Taflon film.

8. The micro-lens of claim 4, wherein the polarized second material comprises deionized (DI) water.

9. The micro-lens of claim 4, wherein the non-polarized material comprises oil.

10. The micro-lens of claim 4, wherein the electrolyte comprises NaCl and SDS.

11. The micro-lens of claim 4, wherein the electrolyte comprises a polymer electrolyte.

12. The micro-lens of claim 9, wherein the oil comprises a first mixture that comprises bromonaphthalene, chloronaphthalene, and dodecane or a second mixture that comprises chloronaphthalene and bromododecane.

13. The micro-lens of claim 12, wherein the oil comprises the first mixture, and a mixing ratio of chloronaphthalene and dodecane is in a range from 50:50 to 99:1.

14. The micro-lens of claim 12, wherein the oil comprises the second mixture, and a mixing ratio of chloronaphthalene and bromododecane is in a range from 50:50 to 99:1.

15. The micro-lens of claim 11, wherein the polymer electrolyte comprises 0.01% to 1% polyacrylic acid.

16. A micro-lens array that comprises a plurality of micro-lenses, each micro-lens comprising:
a plurality of electrodes disposed to form a perimeter surrounding a space,
wherein a first electrode of the plurality of electrodes comprises in a plan view first and second bends on both ends of the first electrode, wherein the first and second bends are bent inward and face each other, and wherein the first and second bends overlap edges of an additional electrode among the plurality of electrodes; and
an electrowetting liquid layer disposed in the space and separated from the electrodes, and that comprises a focal length controlled by a voltage applied to the electrodes.

17. The micro-lens array of claim 16, wherein the micro-lenses are arranged as a curved surface.

18. A three-dimensional (3D) display, comprising:
a first micro-lens unit comprising an array of micro-lenses configured to focus an image of an object on a location, wherein at least one micro-lens comprises
a plurality of electrodes disposed to form a perimeter surrounding a space, wherein at least one of the electrodes comprises in a plan view a bend, the bend forming a corner of the perimeter, and wherein the bend has surfaces parallel to surfaces of an adjacent electrode, and
an electrowetting liquid layer disposed in the space and separated from the electrodes, and that comprises a focal length controlled by a voltage applied to the electrodes;
an image pick-up unit disposed inside of the 3D display, and configured to pick up the image through the first micro-lens unit;
a control device configured to process the image transmitted from the image pick-up unit;
a display unit configured to project the image transmitted from the control device to a predetermined region; and
a second micro-lens unit configured to focus the image transmitted from the display unit to a predetermined region.

19. The 3D display of claim 18, wherein the at least one micro-lens further comprises:
an insulating layer; and
a hydrophobic film sequentially formed between the electrodes and the electrowetting liquid layer.

20. The 3D display of claim 18, wherein the electrowetting liquid layer comprises:
a non-polar first material;
a polar second material; and
an electrolyte included in at least one of the non-polar first material and the polar second material.

21. The 3D display of claim 19, wherein the insulating layer comprises a $SiO_2$ layer or a SiN layer and the hydrophobic film comprises a Parylene C film, a Cytop film, or a Taflon film.

22. The 3D display of claim 19, wherein the insulating layer comprises a Cytop layer, an $HfO_2$ layer, and a Mo layer that are sequentially stacked in the stated order.

23. The 3D display of claim 20, wherein the second material comprises deionized (DI) water.

24. The 3D display of claim 20, wherein the first material comprises a first mixture that comprises bromonaphthalene, chloronaphthalene, and dodecane or a second mixture that comprises chloronaphthalene and bromododecane.

25. The 3D display of claim 20, wherein the electrolyte comprises NaCl and SDS or a polymer electrolyte.

26. The 3D display of claim 20, wherein the first material comprises the first mixture, and a mixing ratio of chloronaphthalene and dodecane is in a range from 50:50 to 99:1.

27. The 3D display of claim 20, wherein the first material comprises the second mixture, and a mixing ratio of chloronaphthalene and bromododecane is in a range from 50:50 to 99:1.

28. The 3D display of claim 20, wherein the polymer electrolyte comprises from 0.01% to 1% polyacrylic acid.

29. A method of operating a 3D display, the method comprising applying a voltage to a 3D display in order to focus an image on a predetermined location, wherein the 3D display comprises:
a first micro-lens unit configured to focus an image of an object on a given location, comprising
a plurality of electrodes disposed to form a perimeter surrounding a space, wherein at least one of the electrodes comprises in a plain view bend, the bend forming a corner of the perimeter, and wherein the bend has surfaces parallel to surfaces of an adjacent electrode, and
an electrowetting liquid layer disposed in the space and separated from the electrodes, and that comprises a focal length controlled by a voltage applied to the electrodes;
an image pick-up unit that picks-up an image through the first micro-lens unit;
a control device that processes an image transmitted from the image pick-up unit;
a display unit that projects an image transmitted from the control device on a predetermined region; and
a second micro-lens unit configured to focus an image transmitted from the display unit on a predetermined region.

30. The method of claim 29, wherein the voltage is a direct current or an alternating current voltage in a frequency range from about 15 Hz to about 5,000 Hz.

* * * * *